UNITED STATES PATENT OFFICE.

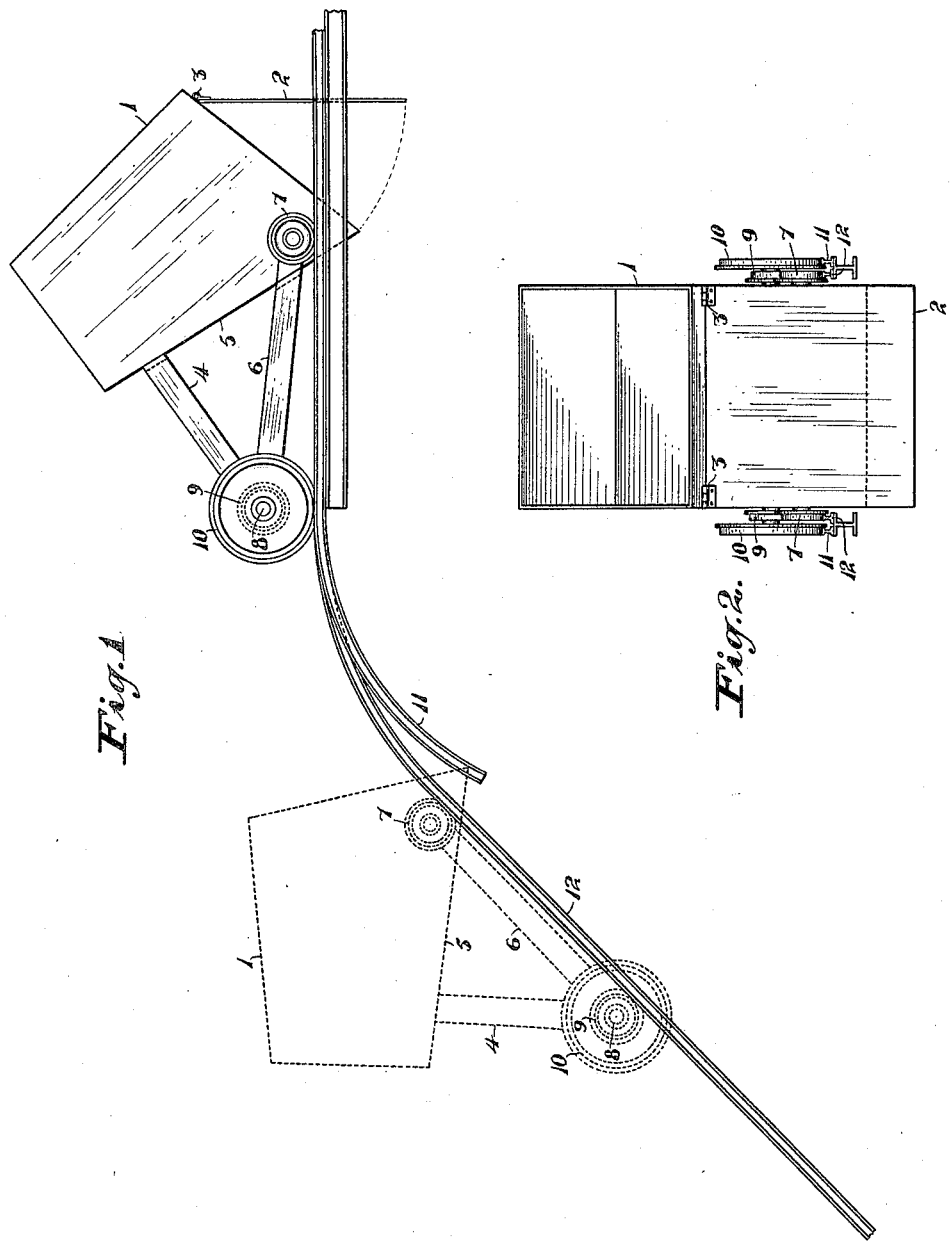

PATRICK F. DUNDON, OF SAN FRANCISCO, CALIFORNIA.

DUMPING-CAR.

1,075,094. Specification of Letters Patent. Patented Oct. 7, 1913.

Application filed October 19, 1912. Serial No. 726,705.

*To all whom it may concern:*

Be it known that I, PATRICK F. DUNDON, a citizen of the United States, residing at San Francisco, in the county of San Francisco and State of California, have invented new and useful Improvements in Dumping-Cars, of which the following is a specification.

The present invention relates to improvements in dumping cars and rails therefor, the object of the invention being to provide such apparatus of very simple and economical construction, which can be used for elevating and carrying, for instance, dirt from excavations, and by which the dirt can be dumped from the car at successive points along a track, as it may be found convenient.

In the accompanying drawing, Figure 1 is a side elevation of my improved dumping car and rail, showing the car in dotted lines in its lower position, and Fig. 2 is a front view thereof.

Referring to the drawing, 1 indicates the body of my improved dumping car provided at its front or advancing end with a swinging door 2, hinged to the body at its upper edge, as shown, at 3. Said body is supported upon a frame or base comprising members 4 extending at right angles to the bottom 5 of the body, and members 6 extending from the lower front portion of said body rearwardly at an acute angle to said bottom, and connected at their rear ends with the members 4. The members 6 carry at their front ends the axles for the front wheels 7, while the rear axle 8 is secured to said members 4 and 6 at their points of juncture. Upon said rear axle are mounted differential rear wheels each comprising a small wheel 9 of substantially the same diameter as the front wheels 7, and a large wheel 10 of considerably greater diameter.

The car is intended to be used principally for elevating, as well as for transporting, and dumping material. Thus 12 indicates an inclined rail, upon which the small rear wheels 9, as well as the front wheels 7 travel when the car is being elevated. When the car nearly reaches the top of said inclined rails, the large rear wheels 10 then engage outer auxiliary rails 11, which, at first, are at a depth below the inner rails corresponding to the difference in radius of the small and large rear wheels, so that said large wheels come into contact with the outer lower rails, while the small wheels are still in contact with the inner upper rails. As the car advances, the level of the outer rails beneath it approaches more and more closely to that of the inner rails, until, at the top of the ascent of the car, said outer and inner rails are at the same level, as clearly shown in Fig. 2. By reason of the angular form of the base of the car, and of the rear wheels being at a much greater distance from the bottom of the car than the front wheels, it results that, when the rear large wheels and front wheels are running on tracks of the same level, the bottom of the car is sufficiently tilted, as shown in full lines in Fig. 1, that, if the door be allowed by suitable automatic releasing device, to swing open by gravity, its contents are immediately discharged.

One important advantage of this construction is that, since the auxiliary rails for the large rear wheels are, on the same level as the main rails for the front wheels, said rails can therefore be continued to any extent so as to dump the load of the car at any point on the track desired.

It will be observed that, in the position in which the car is being loaded, its bottom is substantially level. The top of the car is inclined slightly upward toward the front end, so as to prevent the load being spilt from the top when the car is tilted.

I claim:—

1. In combination with a car, front and rear pairs of wheels therefor, one of said pairs being differential wheels, inclined rails upon which travel one pair of wheels of the differential wheels, and the wheels at the other end of the car, and substantially level pairs of rails, on the same level, of which pairs the last named wheels travel upon one, and the other wheels of the differential wheels travel upon the other, the diameters of said wheels and their distances from the bottom of the car having such proportion that, when so traveling, the bottom of the car is tilted forward.

2. In combination with a car, front and rear pairs of wheels therefor, one of said pairs being differential wheels, inclined rails upon which travel one pair of wheels of the differential wheels, and the wheels at the other end of the car, and substantially level pairs of rails, on the same level, of which pairs the last named wheels travel upon one, and the other wheels of the differential wheels travel upon the other, the last-named pair commencing at a different level from the first-named pair.

3. In combination with a body of a car, front wheels and rear differential wheels therefor, inclined rails upon which travel the smaller wheels of the differential wheels and the front wheels, and substantially level pairs of rails, at the same level, of which pairs the front wheels travel on one, and the large wheels of the differential wheels travel upon the other, the diameters of said wheels and their distances from the bottom of the car having such proportion that, when so traveling, the bottom of the car is tilted forward.

In testimony whereof I have hereunto set my hand in the presence of two subscribing witnesses.

PATRICK F. DUNDON.

Witnesses:
 FRANCIS M. WRIGHT,
 D. B. RICHARDS.

Copies of this patent may be obtained for five cents each, by addressing the "Commissioner of Patents, Washington, D. C."